United States Patent [19]

Foster

[11] Patent Number: 5,145,309
[45] Date of Patent: Sep. 8, 1992

[54] CONTAINER FOR LIQUID BEARING MATERIAL

[76] Inventor: Raymond K. Foster, P.O. Box 1, Madras, Oreg. 97741

[21] Appl. No.: 516,972

[22] Filed: Apr. 30, 1990

[51] Int. Cl.$^5$ .............................................. B65G 25/04
[52] U.S. Cl. ......................... 414/525.1; 414/469; 414/501; 414/525.9; 198/750; 210/534; 220/1.5; 296/183
[58] Field of Search ............... 414/507, 501, 519, 520, 414/525.1, 527, 467, 525.9; 220/1.5; 198/750; 296/183; 210/534

[56] References Cited

U.S. PATENT DOCUMENTS

| 4,478,893 | 10/1984 | Foster | 91/176 |
| 4,611,708 | 9/1986 | Foster | 198/750 |
| 4,623,197 | 11/1986 | Stluka | 298/24 X |
| 4,785,929 | 11/1988 | Foster | 198/750 |
| 4,896,761 | 1/1990 | Foster | 198/750 |
| 4,966,275 | 10/1990 | Hallstrom, Jr. | 414/525.1 X |

FOREIGN PATENT DOCUMENTS 657890 11/1963 Italy .................................. 414/467

OTHER PUBLICATIONS

Aug. 1988 issue of "The Management of World Wastes", p. 32, article entitled Baltimore Shapes Up And Gets Wise to Waste, by Teresa Brumback.

Primary Examiner—Frank E. Werner
Attorney, Agent, or Firm—Delbert J. Barnard

[57] ABSTRACT

A reciprocating floor (12) is provided at the bottom (22) of a container (10). The conveyor (12) may slope rearwardly from a front end to a rear end. A transverse liquid collection trough (30, 32) is provided at the rear end of the conveyor. Liquid in garbage or other material placed in the container (10) settles down onto the conveyor (12). This liquid is directed rearwardly along the conveyor to the trough (30, 32). It flows in the trough to an outlet (34, 34') which delivers it into a collection and holding tank (24). The tank (24) may include a plastic receptacle into which the liquid is collected.

15 Claims, 5 Drawing Sheets

CONTAINER FOR LIQUID BEARING MATERIAL

TECHNICAL FIELD

This invention relates to containers for holding and-/or transporting a material such as garbage which includes a drainable liquid. More particularly, it relates to such a container in which the bottom of the container includes a reciprocating floor conveyor for conveying the material out from the container and a system for collecting and disposing of liquid which drains from the material while it is in the container.

BACKGROUND ART

It is known to deposit garbage into containers which when full of garbage are transported to a landfill or other receiving site for the garbage. It is also known to provide such containers with reciprocating floor containers for facilitating the removal of garbage from the containers. My U.S. Pat. No. 4,785,929, granted Nov. 22, 1988, discloses the floor member and support bearing system for a reciprocating floor conveyor which has been used in garbage collection containers. My U.S. Pat. No. 4,611,708, granted Sep. 16, 1989, discloses the floor members and support bearing system for another type of reciprocating floor conveyor that has been used in garbage containers.

Herein the term "container" is used to mean a truck box, a trailer box, a transport container and fixed installation containers. These containers all include a bottom, two sidewalls and two end walls, one of which is openable. Some include a top. The bottom is formed by or includes a reciprocating floor conveyor.

My aforementioned U.S. Pat. No 4,748,893 discloses a hydraulic drive assembly for powering the reciprocating floor conveyor and a desired sequence of operation.

The principal object of the present invention is to provide a container for garbage or some other material which includes liquid which drains to the bottom of the container, a reciprocating floor conveyor in the container, and a liquid collection and disposal system.

DISCLOSURE OF THE INVENTION

A container constructed according to the present invention is basically characterized by sidewalls and a bottom. The bottom includes a reciprocating floor conveyor. A transverse liquid collection trough is positioned to collect liquid drainage from material that has been added to the container. The trough includes an outlet leading into a liquid collecting and holding tank which is positioned below the outlet. In use, liquid within the material drains down to the bottom of the container and flows to and into the collection trough and out from the outlet of the collection trough into the collection container.

In one embodiment, each floor member of the reciprocating floor conveyor includes a top and a longitudinal channel formed in the top. The channel has a bottom wall and two sidewalls outwardly bounding the bottom wall. Each floor member carries an elongated seal strip which contacts a confronting surface of an adjacent floor member. The seal strips substantially seal the gaps between the floor slat members. Liquid which drains from the material that is in the container is collected in the channels. Such liquid flows lengthwise of the channels into the liquid collection trough.

In another embodiment of the invention, the container bottom is substantially liquid tight. The bottom includes longitudinal liquid collection troughs between the floor members. The collected liquid flows lengthwise of the longitudinal troughs into the transverse trough.

The liquid collecting and holding tank may be located adjacent a side of the container, or may be located substantially at the transverse center of the container, or at any other suitable location.

In preferred form, the liquid collecting and holding tank includes rigid wall means forming a compartment and a plastic container within the compartment into which the liquid is collected. The outlet from the transverse collection trough may be tubular and the plastic container may be in the nature of a plastic bag having an open upper end which is positioned to surround the outlet. In preferred form, the compartment has a substantially hexahedral shape and a sidewall door which is hinged at its bottom to swing downwardly and outwardly. The plastic container is a sheet of plastic material which is folded into a substantially hexahedral shape substantially conforming to the inside dimension of the compartment. A side portion of the plastic sheet is connected to the door in a manner which allows it to swing down with the door and provide a side outlet for the liquid. Spring means, preferably in the form of two bungie cords, are provided for refolding the side portion of the sheet that is connected to the door, so that when the door is closed the side portion of the plastic sheet will be positioned to again form a sidewall of the plastic container.

Other objects, features and advantages of the invention are hereinafter described as a part of the description of the best mode.

BRIEF DESCRIPTION OF THE DRAWINGS

In the drawings like referenced numerals refer to like parts throughout the various views of the drawing figures, and.

BEST MODE FOR CARRYING OUT THE INVENTION

Figure 1:
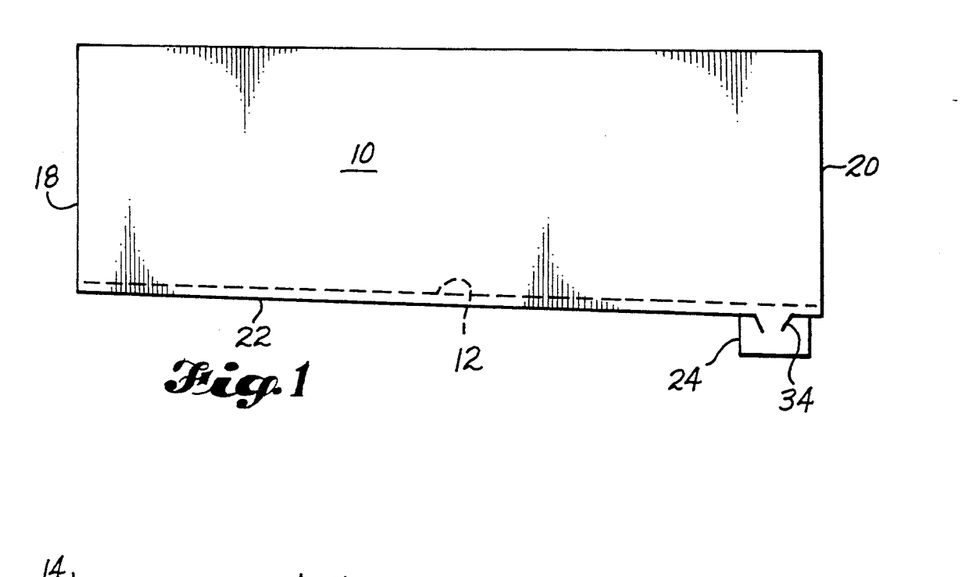
FIG. 1 is a schematic side elevational view of a container for a material such as garbage.

Referring to FIG. 1, a container 10 is shown to include a reciprocating floor conveyor 12. The container 10 may be an open top container or it may have a closed top. As earlier stated, herein the term "container" is used to mean a truck box, a trailer box, a transport container or a fixed installation container. A transport container is a container which is moved on flat bed trucks, rail cars and ships.

Container 10 includes two sidewalls 14, 16, a front end wall 18 and a rear door 20. The rear door may be of the type shown on page 32 of the August 1982 issue of World Wastes.

The reciprocating floor conveyor 12 may be of conventional construction, such as the floor disclosed by my aforementioned U.S. Pat. No. 4,785,929, powered by the hydraulic drive system disclosed by my aforementioned U.S. Pat. No. 4,748,893. These conveyors will not be described in any great detail herein as the construction and operation of them is well disclosed in the patents.

Figure 2:
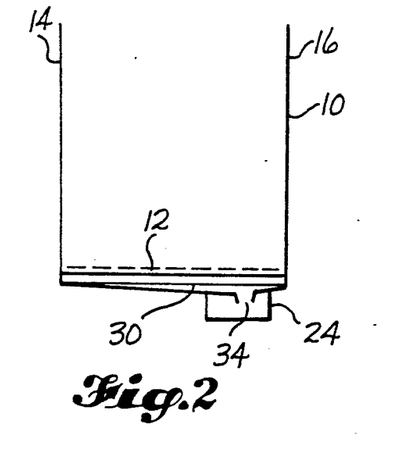
FIG. 2 is an end elevational view of a container for garbage or some other material which includes a liquid, such view showing a liquid collection tank located at one side of the container and at the discharge end of a reciprocating floor conveyor that is in the container.
Figure 3:
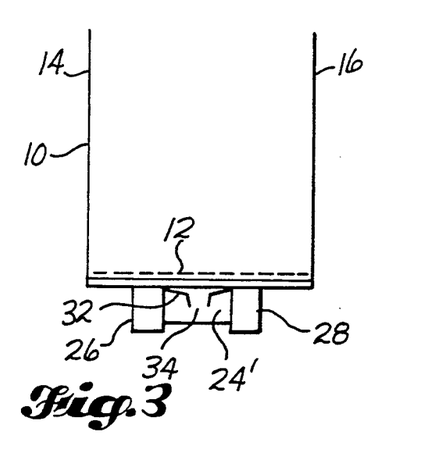
FIG. 3 is a view like FIG. 2, but showing the liquid collecting and holding tank positioned substantially at the transverse center of the container.

FIG. 1 shows the container 10 having a bottom 22 which slopes downwardly as it extends rearwardly. A liquid collection and holding tank 24 is provided at the rear end of the conveyor 12. In FIG. 2 the tank 24 is shown to be positioned adjacent sidewall 16. In FIG. 3 a similar tank 24' is shown to be positioned between two main frame beams 26, 28. As will hereinafter be described in each embodiment, the container 10 is provided with a transverse liquid collection trough 30, 32. Each trough 30, 32 includes a tubular outlet 34. The trough 30, 32 may slope from its opposite end to the outlet 34, to facilitate flow of liquid along the trough 30, 32 to the outlet 34. The sloping bottom 22 allows liquid which settles down to the bottom of the container 10 to flow rearwardly to the transverse collection trough 30, 32. The collection trough 30, 32 collects this water and moves it on to the outlet 34. The outlet 34 directs the liquid down into the tank 24.

Figures 4, 4A, 5, 6:
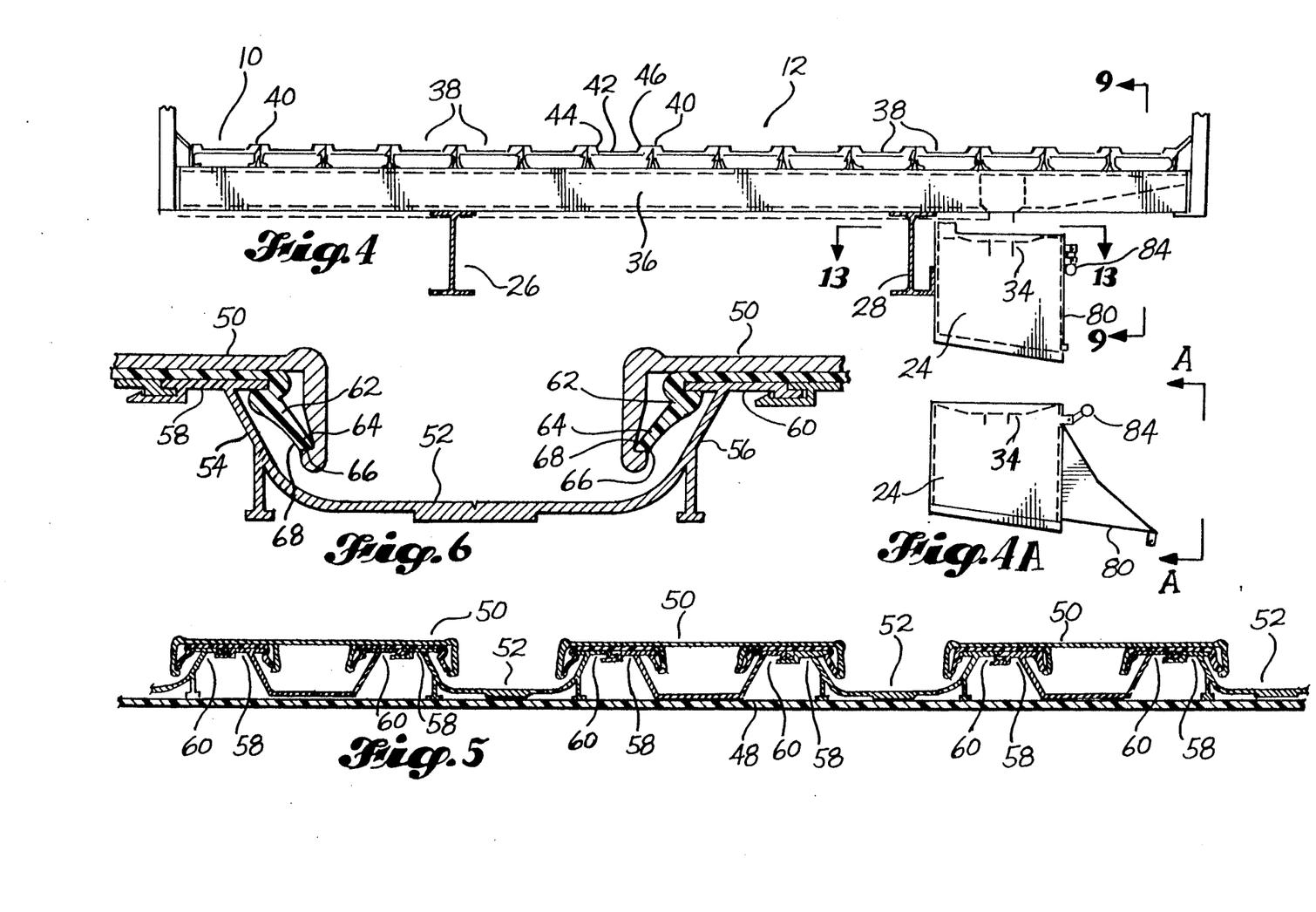
FIG. 4 is an end elevational view of a reciprocating floor conveyor, showing one embodiment of a reciprocating floor conveyor and showing a liquid collecting and holding tank positioned adjacent one side of the container.
FIG. 4A is a side elevational view of the liquid collecting and holding tank shown in FIG. 4, but with its discharge door in an open position.
FIG. 5 is an enlarged scale fragmentary view of a modified reciprocating floor conveyor.
FIG. 6 is an end elevational view on yet a larger scale of a portion of the reciprocating floor conveyor shown by FIG. 5, such view showing a liquid collection trough that is formed between adjacent floor members.

FIG. 4 is an end elevational view of a trailer box 10 with the rear doors open. The trailer frame includes a pair of main frame beams 26, 28. An end frame member 36 is provided at the rear of the trailer box 10. The reciprocating floor conveyor comprises a plurality of elongated floor members 38. The floor members 38 are parallel to each other and are each supported on and by one or more elongated support beams, and a plurality of bearings on each beam. The support beams and the bearings are disclosed by the aforementioned U.S. Pat. No. 4,785,929. The floor members 38 each carry an elongated seal strip 40. Each seal strip 40 is mounted on one side of each floor slat member 38. It includes a portion which projects over into sliding contact with a confronting portion of the adjacent floor slat member 38. By way of typical and therefore nonlimited example, the seal strips may be as disclosed in my U.S. Pat. No. 4,896,761, granted Jan. 30, 1990.

The floor members 38 are characterized by a top wall which includes a longitudinal channel. The longitudinal channel is defined by a bottom surface 42 and a pair of side surfaces 44, 46 which border the bottom surface 42. The construction of the channel is very well disclosed in my aforementioned U.S. Pat. No. 4,785,929. For example, see FIG. 1 of that patent.

When channel flooring is used, the liquid which migrates down through the garbage or other liquid containing material is picked-up in the channels 42, 44, 46 and is directed by the channels to the rear end of the conveyor 12. At the rear end of the conveyor 12 the liquid is directed into the transverse collection trough 30, 32. The seals 40 are not liquid tight but the overall construction of the conveyor 12 results in most of the water being picked-up by the channels 42, 44, 46 and directed by them rearwardly to the trough 30, 32. In a second embodiment, the container includes a water tight floor 48. The container may be constructed from fiberglass and may have an impervious bottom 48, two sidewalls, an end wall, a top, and rear end doors. FIG. 5 shows a bottom portion of such a container. In this embodiment the floor slat members 50 are supported on and by elongated support beams which may be formed by aluminum extrusions. Each aluminum extrusion is of a somewhat channel form and it extends longitudinally of the floor members 50. Each extrusion includes a bottom web 52, sidewalls 54, 56 and top webs 58, 60. As shown by FIG. 6, each web 60 includes a tongue which fits within a groove carried by each web 58. The extrusions are connected together at the tongue and groove joints. Preferably, these joints are welded shut. Plastic snap-on bearings 62 are snapped onto the connected together webs 58, 60, in the manner illustrated. Bearings 62 include side wing portions 64 which extend laterally outwardly and downwardly to lower edges 66. The floor members 50 include shoulders 68 which engage the edges 66. This engagement of the edges 66 and the shoulders 68 hold the floor members 50 in place on the support beams. As will be evident, the construction of the wings 64 allows the floor members 50 to be pushed down onto the support beams for installation. The shoulders 68 exert an inwardly bending force on the wings 64, causing them to bend inwardly and allow passage of the shoulders 66 downwardly into a position below the edges 66. Following such passage, the wings 64 spring outwardly into a position placing the edges 66 above the shoulders 68. This placement of the edges 66 to the shoulders 68 resists unwanted upper movement of the floor members off from the bearings 62.

In the preferred embodiment, the liquid collection and storage tank 24 comprises a bottom 70, sidewalls 72, 74, a top 76, an end wall 78 and a door 80. The door 80 includes a hinge 82 along a lower edge which hinge connects it to the bottom 70. The door 80 is swingable in position between an up position as shown in FIG. 4 and a down position as shown in FIG. 4A. A suitable lock 84 is provided for holding the door in a closed position. Any type of lock can be used and for that reason the lock 84 is not shown in detail.

Figure 7:
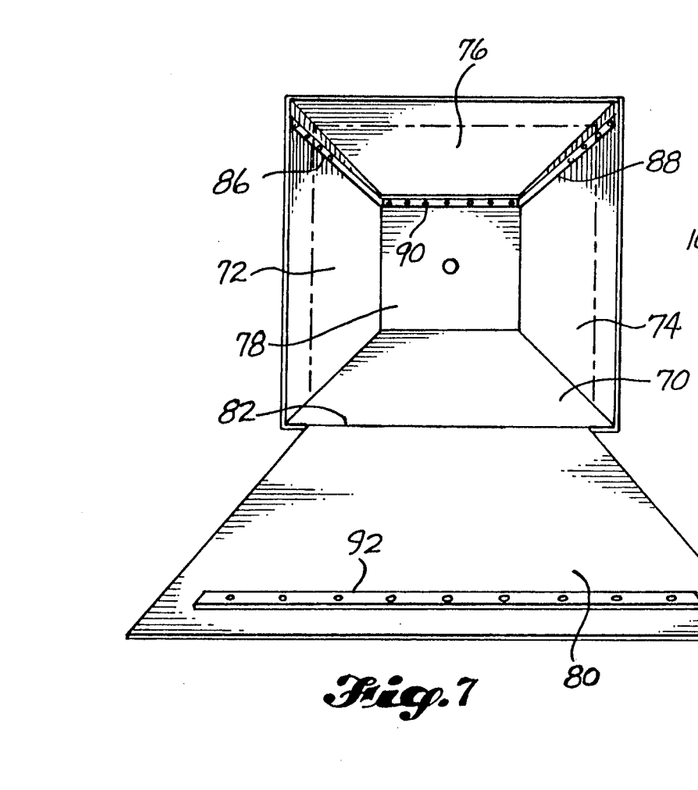
FIG. 7 is a view taken substantially along the aspect of line A—A of FIG. 4A, but with the plastic container omitted.
Figure 8:
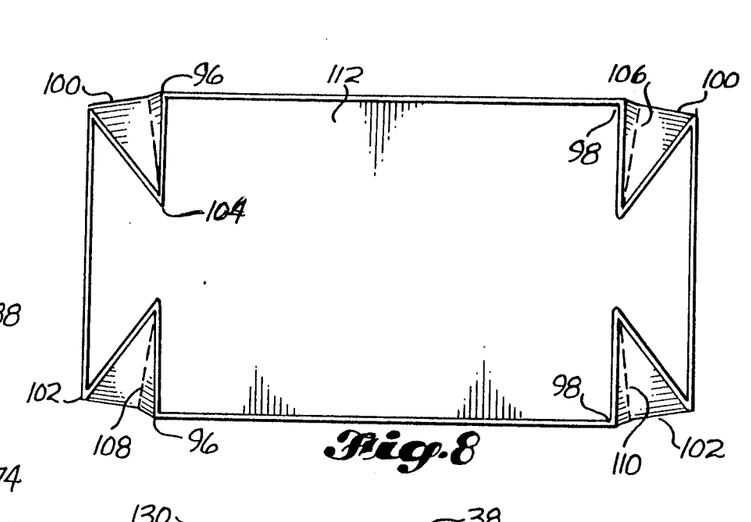
FIG. 8 is a top plan view of a plastic container in a partially folded position.
Figure 12:
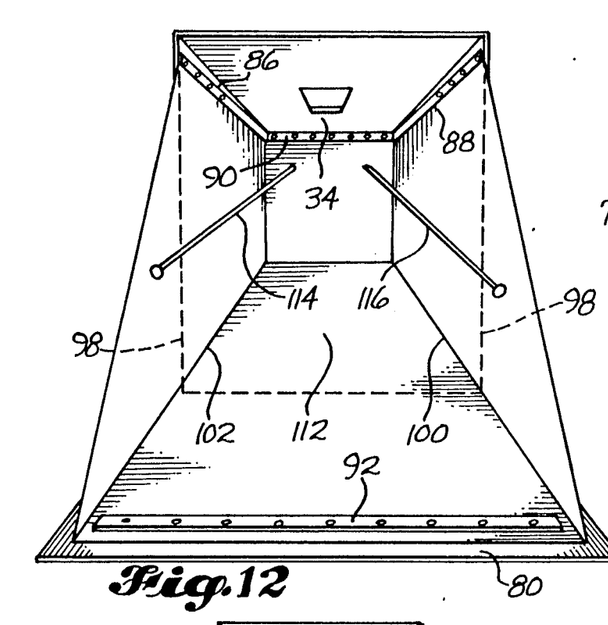
FIG. 12 is a view like FIG. 7, but showing the plastic container in shape.
Figure 13:
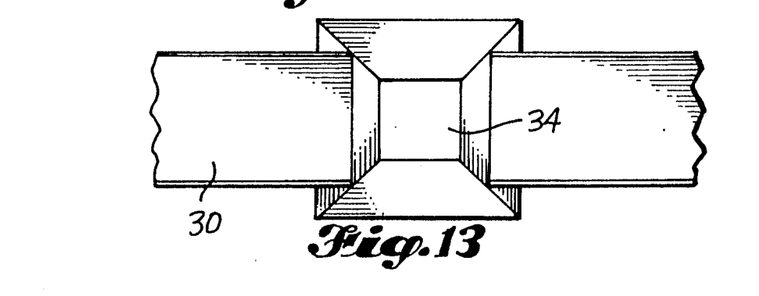
FIG. 13 is an enlarged scale top plan view in the vicinity of the outlet from the transverse collection trough, such view being taken substantially along line 13—13 of FIG. 4.
Figure 14:
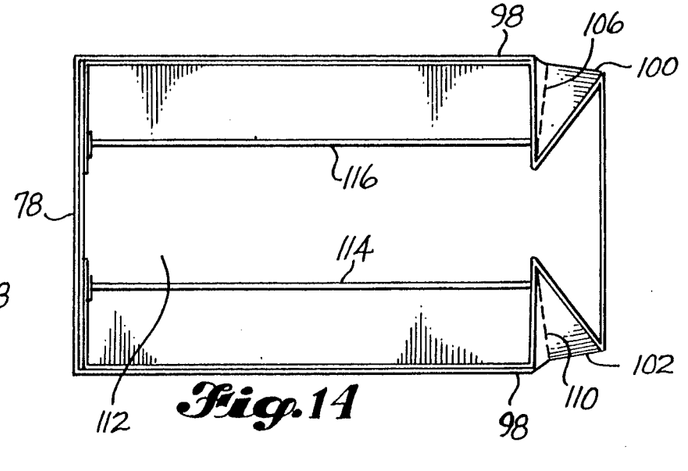
FIG. 14 is view similar to FIG. 8, but showing the inner end of the plastic condition folded and secured to a sidewall of the compartment, and further showing bungie cords extending from such compartment wall to opposite side portions of the plastic material.

As shown by FIGS. 7 and 12, clamp plates 86, 88, 90, 92 are provided on the inside of the compartment walls. These clamp plates 86, 88, 90, 92 are used to clamp upper edge portions of a sheet of plastic material 94 which is folded to form a liquid receiving receptacle. Referring to FIG. 10, the sheet 94 is shown in a flat condition. The sheet 94 is folded along parallel lines 100, 102 and along parallel lines 96, 98 so as to form four sidewalls projecting upwardly from a bottom 112. Corner portions of the sidewalls are folded along lines 104, 106, 108, 110 in the manner shown in FIGS. 9, 12 and 14. The sidewalls so formed that is adjacent the receptacle wall 78 is secured to the receptacle wall 78, including by use of the clamp strip 90. Clamp strip 90 is a removable strip of metal which is secured in place by a plurality of screws. Clamp strips 86, 88, 92 are of a like construction. The end wall and the two sidewalls of the plastic receptacle are secured to the end wall 78 and the two sidewalls 72, 74 of the receptacle 24, by use of the clamp strips 86, 88, 90. The upper edge of the remaining wall of the plastic container is connected to the door 80 by use of the clamp strip 92. Preferably, bungie cord type springs 114, 116 are interconnected between the rear wall 78 and the fold-in corner portions of the plastic receptacle which is adjacent the door 80. As shown by FIGS. 4A and 12, a mere swinging open of the door 80 causes an unfolding of the portion of the plastic receptacle which is adjacent the door 80. The bungie cords 114, 116 are stretched by the downward movement of the door 80. The door 80 can be swung down into a position below a horizontal position, to allow liquid which has been collected With in the plastic receptacle to flow out of the funnel formed by the folded out portion of the plastic receptacle. When the door 80 is swung back up into a closed position the bungie cords 114, 116 refold the outer side portion of the plastic receptacle back into a shape in which it provides a side of the liquid containing receptacle.

Figure 15:
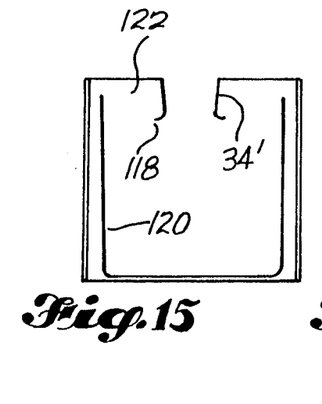
FIG. 15 is a vertical section schematic of a modified construction of the liquid collecting and holding tank, such view showing the plastic container in the form of a plastic bag having an upper open end which is in a surrounding relationship to a tubular outlet for the transverse liquid collection trough.
Figure 16:
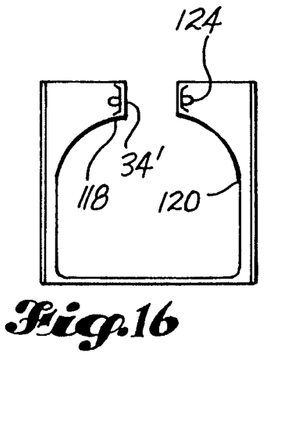
FIG. 16 is a view like FIG. 15, but showing the upper portion of the plastic bag clamped or otherwise secured to the tubular outlet from the transverse liquid collection trough.

FIGS. 15 and 16 illustrate a second embodiment of the collection and storage tank. In this embodiment the trough outlet 34' is tubular and may include a lower end lip 118. Outlet 34' leads into a foresighted metal housing which includes a bottom. As before, one side of the receptacle is in the form of a door so that it can be opened. In this embodiment the plastic receptacle is in the form of a plastic bag 120. The plastic bag 120 has an opened upper end portion 122 which surrounds the tubular outlet 34'. The upper end of the bag 120 is gathered into a position about the tubular outlet 34' and is secured in place by any suitable clamp, tie mechanism, etc. In FIG. 16 the top of the bag 120 is clamped in place by a spring collar 124 which is stretched and wrapped about the bag neck and then its two ends are connected together.

Figure 9:
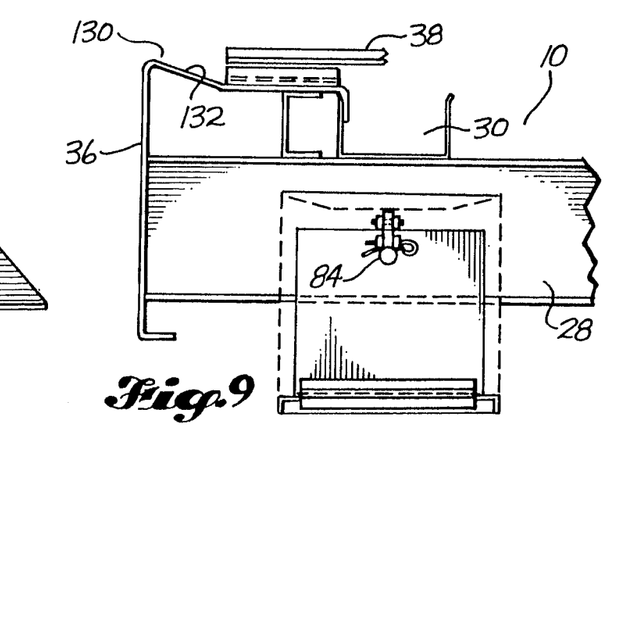
FIG. 9 is a fragmentary sectional view taken substantially along line 9—9 of FIG. 4.
Figure 10:
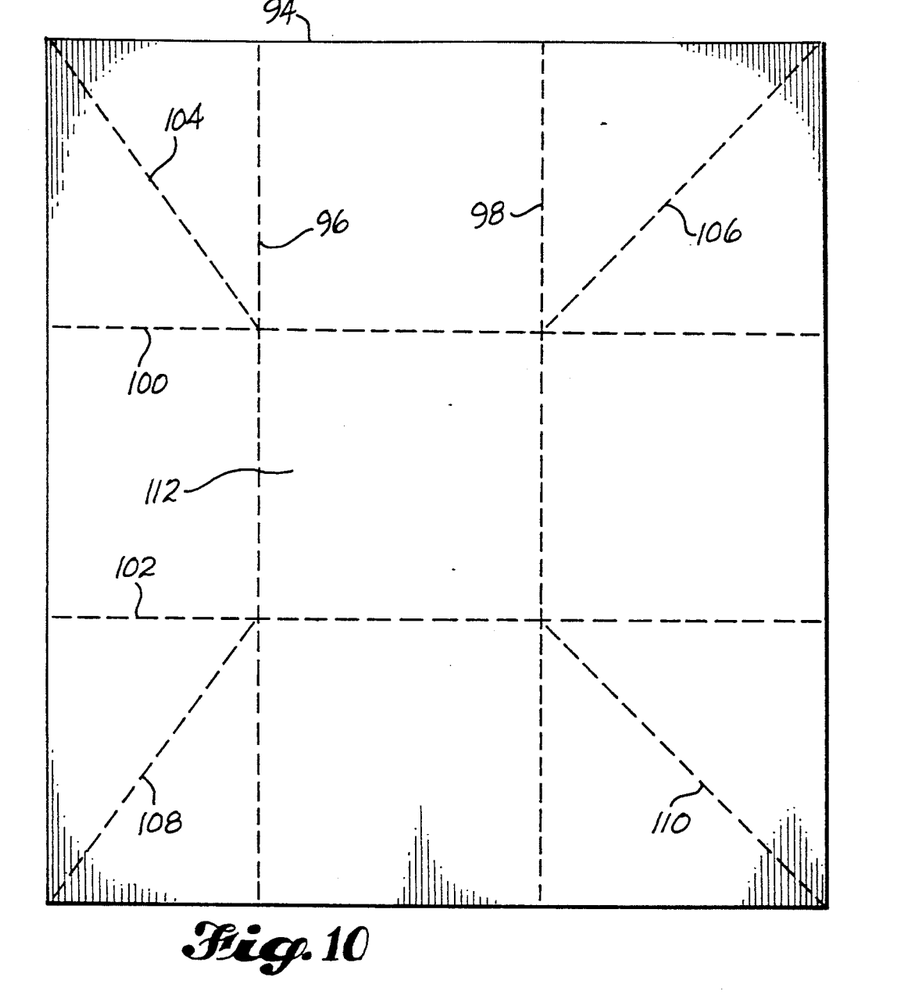
FIG. 10 is a top plan view of a flat sheet of plastic, such view including dash lines indicating where the plastic sheet is folded to form the plastic container.
Figure 11:
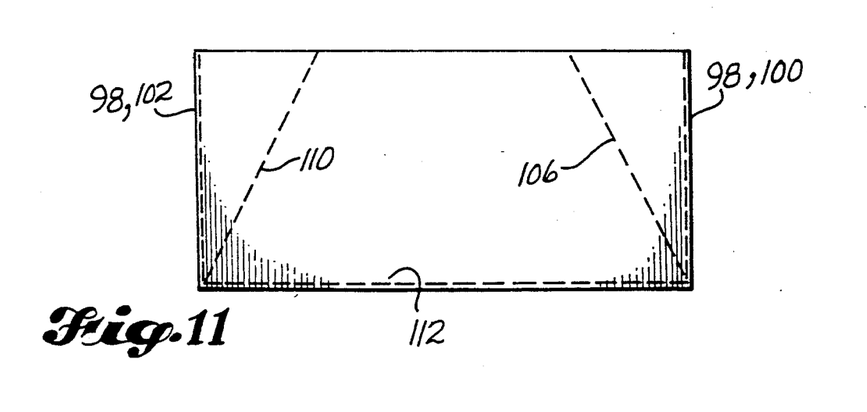
FIG. 11 is an end view of the container formed by folding the plastic sheet.

Referring to FIG. 9, the trough 30 is shown to be positioned below the level of the floor members 38 and forwardly in the container 10 from the rear frame member 36. The rear frame member 36 projects upwardly at 130 and then slopes downwardly and forwardly at 132. Liquid flowing rearwardly along the conveyor 12 flows downwardly into a trough region formed between the rear end of the conveyor 12 and the sloping wall 132. The liquid then flows forwardly in spaces between the longitudinal support beams for the floor slat members. The liquid flows forwardly into the transverse collection trough 30. It then is directed by the trough 30 to the outlet 34 and from the outlet 34 falls down into the tank 24.

The disclosed embodiments are provided for purposes of example only. The scope of protection is to be determined by the following claims, interpreted in accordance with the established rules of patent claim interpretation, including use of the doctrine of equivalents.

What is claimed is:

1. A container for holding a material which may include a drainable liquid, comprising:
   sidewalls, endwalls, and a bottom;
   said bottom including a reciprocating floor conveyor comprising a plurality of elongated floor members which in use are driven in one direction for advancing a load and are retracted in an opposite direction;
   said container including a transverse liquid collection trough positioned to collect liquid drainage from the material, said trough including an outlet; and
   a liquid collecting and holding tank positioned below said outlet,
   whereby liquid within the material drains down to the bottom of the container and flows to and into the collection trough and out from the outlet of the collection trough into the liquid collecting and holding tank.

2. A container according to claim 1, wherein the container bottom includes a substantially liquid tight bottom wall and said floor members are mounted on the bottom wall, and said container bottom also includes longitudinal liquid collection troughs between the floor members, whereby liquid that drains from material that is in the container is collected in said longitudinal troughs and flows there along to the transverse liquid collection trough.

3. A container according to claim 1, wherein said outlet and said liquid collecting and holding tank are located adjacent a side of the container.

4. A container according to claim 1, wherein the outlet and the liquid collecting and holding tank are located substantially at the transverse center of the container.

5. A container according to claim 1, wherein said transverse liquid collection trough is positioned below the floor members, and wherein collected liquid flows endwise off the floor members and then back under the floor members and into said trough.

6. A container according to claim 5, wherein the bottom of the container includes a substantially liquid tight bottom wall having a main portion on which the floor members are supported and an end portion disposed endwise of the conveyor end, said end portion extending upwardly from the main portion, whereby collected liquid will flow endwise off of the conveyor into a space between the conveyor end and said end portion of the bottom wall, and such liquid will then flow from said space towards and below the floor members, into the liquid collection trough.

7. A container for holding a material which may include a drainable liquid, comprising:
sidewalls, endwalls, and a bottom;
said bottom including a reciprocating floor conveyor comprising a plurality of elongated floor members which in use are driven in one direction for advancing a load and are retracted in an opposite direction;
said container including a transverse liquid collection trough positioned to collect liquid drainage from the material, said trough including an outlet; and
a liquid collecting and holding tank positioned below said outlet,
whereby liquid within material drains down to the bottom of the container and flows to and into the collection trough and out from the outlet of the collection trough into the liquid collecting and holding tank; and
wherein each floor member includes a top and a longitudinal channel formed in the top, said channel having a bottom wall and two sidewalls outwardly bounding the bottom wall, and each floor member carrying an elongated seal strip which contacts a confronting surface of an adjacent floor member, said seal strips substantially sealing the gaps between the floor slat members, whereby liquid which drains from material that is in the container is collected in the channels and flows along said channels to the liquid collection trough.

8. A container according to claim 7, wherein said transverse liquid collection trough is positioned below the floor members, and wherein collected liquid flows endwise off the floor members and then back under the floor members and into said trough.

9. A container for holding a material which may include a drainable liquid, comprising:
sidewalls, endwalls, and a bottom;
said bottom including a reciprocating floor conveyor comprising a plurality of elongated floor members which in use are driven in one direction for advancing a load and are retracted in the opposite direction;
said container including a transverse liquid collection trough positioned to collect liquid drainage from the material, said trough including an outlet; and
a liquid collecting and holding tank positioned below said outlet,
whereby liquid within the material drains down to the bottom of the container and flows to and into the collection trough and out from the outlet of the collection trough into the liquid collecting and holding tank; and
wherein the liquid collecting and holding tank includes rigid wall means defining a compartment and a plastic container within said compartment into which the liquid is collected.

10. A container according to claim 9, wherein the outlet is tubular and the plastic container includes an open upper end portion which surrounds the outlet.

11. A container according to claim 9, wherein said compartment has a substantially hexahedral shape and a sidewall door which is hinged at its bottom to swing downwardly and outwardly, and wherein the plastic container is a sheet of plastic material that is folded into a substantially hexahedral shape substantially conforming to the inside dimensions of the compartment, and wherein a side portion of said sheet is connected to the door so as to swing down with the door and provide a side outlet for the liquid, whereby the holding tank can be quickly emptied by a user swinging the door into an open position.

12. A container according to claim 11, comprising spring means connected to said door, said spring means normally biasing the door into a closed position.

13. A container according to claim 12 wherein said spring means is connected to portions of the plastic sheet and serve to pull the plastic sheet into the said substantially hexahedral shape when the door is closed.

14. A container according to claim 9, wherein said transverse liquid collection trough is positioned below the floor members, and wherein collected liquid flows endwise off the floor members and then back under the floor members and into said trough.

15. A container for holding a material which may include a drainable liquid, comprising:
sidewalls, endwalls, and a bottom;
said bottom including a substantially liquid tight bottom wall having a main portion and a rear end portion, and a reciprocating floor conveyor comprising a plurality of elongated floor members on said main portion, and which in use are driven rearwardly of the container for unloading a load and are retracted forwardly of the container, said conveyor having a rear end portion;
said container including a liquid collection trough positioned below the conveyor, said trough including an outlet;
a liquid collecting and holding tank positioned below said bottom wall and below said outlet;
wherein the end portion of the bottom wall is disposed rearwardly of the conveyor end portion and said end portion of the bottom wall extends upwardly from the main portion,
whereby liquid within the material drains down to the bottom of the container and flows to an into a space between the rear end portion of the conveyor and the end portion of the bottom wall, and from such space flows forwardly below the floor members and into the collection trough, and then flows from said collection trough to and through the outlet of the collection trough into the liquid collecting and holding tank.

* * * * *

UNITED STATES PATENT AND TRADEMARK OFFICE
CERTIFICATE OF CORRECTION

PATENT NO. : 5,145,309
DATED : September 8, 1992
INVENTOR(S) : Raymond Keith Foster It is certified that error appears in the above-identified patent and that said Letters Patent is hereby corrected as shown below:

On the title page, under section [56] References Cited,
"4,478,893" should be -- 4,748,893 --.

Column 5, line 44, "With" should be -- with --.

Claim 6, column 7, line 1, "said space" should be
-- such space --.

Claim 13, column 8, line 21, there is a comma after "claim 12".

Signed and Sealed this

Nineteenth Day of April, 1994

Attest:

BRUCE LEHMAN

Attesting Officer    Commissioner of Patents and Trademarks